(12) United States Patent
Stevens et al.

(10) Patent No.: US 9,972,817 B2
(45) Date of Patent: May 15, 2018

(54) METHOD FOR PRODUCING A WATERPROOF AND ION-CONDUCTING FLEXIBLE MEMBRANE

(71) Applicant: ELECTRICITE DE FRANCE, Paris (FR)

(72) Inventors: Philippe Stevens, Noisy Rudignon (FR); Gwenaelle Toussaint, Nemours (FR); Gilles Lancel, Cachan (FR); Christel Laberty-Robert, Montrouge (FR); Damien Bregiroux, Les Lilas (FR); Clement Sanchez, Bures sur Yvette (FR)

(73) Assignee: Electricite de France, Paris (FR)

( * ) Notice: Subject to any disclaimer, the term of this patent is extended or adjusted under 35 U.S.C. 154(b) by 0 days. days.

(21) Appl. No.: 15/536,238

(22) PCT Filed: Dec. 14, 2015

(86) PCT No.: PCT/FR2015/053497
§ 371 (c)(1),
(2) Date: Jun. 15, 2017

(87) PCT Pub. No.: WO2016/097571
PCT Pub. Date: Jun. 23, 2016

(65) Prior Publication Data
US 2017/0352856 A1    Dec. 7, 2017

(30) Foreign Application Priority Data

Dec. 17, 2014  (FR) ..................... 14 62667

(51) Int. Cl.
*H01M 2/14*    (2006.01)
*H01M 2/16*    (2006.01)
(Continued)

(52) U.S. Cl.
CPC ......... *H01M 2/145* (2013.01); *H01M 2/1606* (2013.01); *H01M 2/1666* (2013.01);
(Continued)

(58) Field of Classification Search
CPC .. H01M 2/145; H01M 2/1606; H01M 2/1666; H01M 2/1673; H01M 10/36;
(Continued)

(56) References Cited

U.S. PATENT DOCUMENTS 8,568,921 B1    10/2013  Johnson
2003/0168756 A1*  9/2003  Balkus, Jr. ............. B82Y 30/00
                                                    264/10

(Continued)

FOREIGN PATENT DOCUMENTS

| JP | 2016-039138 A | 3/2016 |
|---|---|---|
| KR | 10-2010-0072532 A | 7/2010 |
| KR | 20100072532 | * 7/2010 |

OTHER PUBLICATIONS

KR20100072532 M, Jul. 2010.*
(Continued)

*Primary Examiner* — Alex Usyatinsky
(74) *Attorney, Agent, or Firm* — Drinker Biddle & Reath LLP (57) ABSTRACT

A method for producing a waterproof and ion-conducting flexible membrane intended for protecting a metal electrode. It comprises a synthesis by electrically assisted extrusion of compact fibers forming an ion-conducting fiber array comprising a first material. The fiber array defines a first surface and a second surface opposite the first surface. Subsequently, the fiber array is impregnated with a polymer of a second material, to form a metal electrode protection membrane. The fiber array forms paths for conducting ions between the first surface and the second surface and through (Continued)

the second material. The first surface is intended to be in contact with the metal electrode.

14 Claims, 3 Drawing Sheets

(51) Int. Cl.
| | |
|---|---|
| H01M 10/36 | (2010.01) |
| H01M 12/08 | (2006.01) |
| H01M 8/1007 | (2016.01) |
| H01M 8/1041 | (2016.01) |
| H01M 4/86 | (2006.01) |
| B29C 47/00 | (2006.01) |
| H01M 4/90 | (2006.01) |
| D01D 5/00 | (2006.01) |
| C04B 35/634 | (2006.01) |

(52) U.S. Cl.
CPC ....... *H01M 2/1673* (2013.01); *B29C 47/0014* (2013.01); *C04B 35/634* (2013.01); *C04B 2235/441* (2013.01); *C04B 2235/6021* (2013.01); *D01D 5/0038* (2013.01); *H01M 4/8605* (2013.01); *H01M 4/8657* (2013.01); *H01M 4/90* (2013.01); *H01M 8/1007* (2016.02); *H01M 8/1041* (2013.01); *H01M 10/36* (2013.01); *H01M 12/08* (2013.01); *Y02E 60/128* (2013.01)

(58) Field of Classification Search
CPC ................. H01M 12/08; Y02E 60/128; C04B 35/62231; C04B 35/62236; C04B 35/6224; C04B 35/6225; C04B 35/62259; C04B 35/62263; C04B 35/624; C04B 35/6269; C04B 35/634
See application file for complete search history.

(56) References Cited

U.S. PATENT DOCUMENTS

| | | | |
|---|---|---|---|
| 2008/0057386 A1 | 3/2008 | Visco et al. | |
| 2009/0155676 A1* | 6/2009 | Zhamu | H01M 2/166 |
| | | | 429/129 |
| 2011/0165466 A1* | 7/2011 | Zhamu | B82Y 30/00 |
| | | | 429/231.8 |
| 2013/0260283 A1* | 10/2013 | Valle | C04B 35/62231 |
| | | | 429/492 |

OTHER PUBLICATIONS

KR20100072532 MT.*
Decision to grant a Patent issued by JPO.*
English language translation of Office Action issued in related application JP 2017-532873, dated Nov. 20, 2017, 3 pages.

* cited by examiner

METHOD FOR PRODUCING A WATERPROOF AND ION-CONDUCTING FLEXIBLE MEMBRANE

CROSS-REFERENCE TO RELATED APPLICATIONS

This application is the U.S. national phase of the International Patent Application No. PCT/FR2015/053497 filed Dec. 14, 2015, which claims the benefit of French Application No. 14 62667 filed Dec. 17, 2014, the entire content of which is incorporated herein by reference.

TECHNICAL FIELD

The invention refers to the field of separators for electrochemical systems. More specifically, the invention refers to a method for producing a membrane intended to protect a metal electrode and the membrane obtained by this method.

TECHNOLOGICAL BACKGROUND

In general, electrochemical cells are composed of a negative electrode, a positive electrode and an electrolyte enabling charge carriers to transfer from one electrode to the other.

Electrochemical cells of the metal-air type are generally composed of a liquid electrolyte. The negative electrode, typically formed from a metal compound M, breaks down into $M^{n+}$ ions during discharge while air is reduced at the positive electrode, called the air electrode, according to the reactions:

Discharge at the negative electrode: 
$M \rightarrow M^{n+} + n\ e^-$

Discharge at the positive electrode: 
$O_2 + 2\ H_2O + 4\ e^- \rightarrow 4\ OH^-$

Alkali metals from group 1 of the periodic table used as active material for the negative electrode are generally not stable in the aqueous electrolyte, and the electrode made of such an alkaline material must be protected by a waterproof barrier.

To ensure such protection, a rigid ceramic membrane is commonly used. Conductive ceramics ensure the dual function of enabling the passage of ions from the negative electrode to the liquid electrolyte and of preventing the liquid electrolyte from directly entering into contact with the metal of the electrode.

However, using rigid ceramic membranes involves a double constraint the thickness of the membrane. This thickness must be sufficiently thick to guarantee good mechanical strength due to the fragility of the ceramic, but also sufficiently thin to reduce the ionic resistance of the ceramic and to limit power losses associated with this resistance. This compromise between ionic conductivity and mechanical strength limits the performance of these membranes.

When the cell is recharged, oxygen is produced at the positive electrode and the metal is deposited by reduction at the negative electrode, according to the reactions:

Recharge at the negative electrode: 
$M^{n+} + n\ e^- \rightarrow M$

Recharge at the positive electrode: 
$4\ OH^- \rightarrow O_2 + 2\ H_2O + 4\ e^-$ This then poses a second problem affecting the negative electrodes protected by a rigid ceramic membrane. Indeed, metal is generally not deposited homogenously on the negative electrode. Consequently, it is not uncommon for the negative electrode to undergo significant structural modifications after several charge/discharge cycles. In practice, such structural modifications result in the formation of cavities and protuberances known as dendrites on the surface of the negative electrode.

When ions traverse the ceramic membrane from the electrolyte to the electrode, they do not always deposit uniformly on the surface of the negative electrode. Therefore mechanical stresses at the interface between the protective ceramic membrane and the negative electrode are created. In addition, eventually some areas of the negative electrode are no longer in direct contact with the ceramic membrane, thereby reducing the contact surface between the membrane and the electrode. This further reduces the conduction area of ions through the membrane and creates non-active areas on the electrode where contact between the membrane and the electrode is lost.

Producing rigid ceramic membranes presents another disadvantage connected to the fact that they are only suitable for a single size and shape of electrode. The method for producing a ceramic membrane should be suitable for matching the geometry of a given electrode, and does not enable membranes adaptable to any type of electrode to be produced.

For the reasons mentioned above, a means for protecting a metal electrode of an electrochemical cell that enables ions to be effectively conducted between the electrode and the electrolyte, while protecting the metal electrode from water, is being sought.

SUMMARY

To respond to the problems mentioned above, the present invention proposes a method for producing a waterproof and ion-conducting flexible membrane intended for protecting a metal electrode comprising:

synthesizing, by electrically assisted extrusion, sealant fibers forming an array of ion-conducting fibers comprising at least one first material, the fiber array defining a first surface and a second surface opposite the first surface;

impregnating the fiber array with a polymer of a second material, to form a metal electrode protection membrane, the fiber array forming ion conduction paths between the first and second surfaces and through the polymer of the second material, the first surface being intended to be in contact with the metal electrode.

The invention has two steps that can be implemented simultaneously or sequentially. Sealant fibers in a first material are produced by extrusion with application of an electrical field. These sealant fibers form an array of fibers capable of conducting metal ions of the element from which a negative electrode of an electrochemical cell is made for example. The "sealant" character of the conductive fibers, opposed to porous fibers, enables ions larger than protons to be conducted, however without allowing water (in liquid or vapor form) or a liquid electrolyte to flow down a fiber or be absorbed by the sealant fiber. The fiber array is impregnated with a second material that is present in polymer form. This polymer enables a flexible and waterproof membrane to be constituted with the fiber array. One of the surfaces of the membrane is in contact with the metal electrode while the other surface is in contact with an electrolyte.

The waterproof polymer of the second material of the membrane forms a matrix that protects the electrode from the electrolyte while the fibers that traverse this polymer enable ions to be conducted on either side of the membrane. Typically, the polymer of the second material enables an electrically insulating matrix for electrons to be constituted.

The matrix may also be electrically insulating for ions. The ions thus preferentially follow a conduction path along the fibers of the fiber array.

The membrane thus produced protects a metal electrode from water. The membrane, given its composition based on sealant fibers impregnated in a polymer, is flexible, which enables it to easily follow the shape of the metal electrode even when the latter undergoes structural modifications. This can, for example, be produced after several charge and discharge cycles of a metal-air battery comprising the metal electrode protected by the membrane.

The specific use of electrically assisted extrusion enables easily producing sealant fibers whose mechanical properties, size and composition can be controlled. In addition, this technique enables a fiber-dense array to be obtained rapidly. Electrically assisted extrusion can also be combined with the impregnation step in the sense that the polymer of the second material can coat each sealant fiber at the outlet of an electrically assisted extrusion device used to synthesize the fiber.

According to an embodiment, the method may further comprise:
  protecting an electrode of a metal-air type electrochemical cell based on an alkali metal from an aqueous medium, by means of the membrane, the polymer in the membrane impregnation step being waterproof and gas-proof and electrically insulating.

In metal-air type electrochemical cells using an alkali metal, the metal electrode, corresponding to the negative electrode, is not stable and deteriorates in contact with the aqueous electrolyte. The use of a sealant and electrically insulating compound as the second material proves well suited for optimizing the protection of the negative electrode in this particular context. In metal-air type electrochemical cells, combining waterproofness with gas-proofness may also be advantageous, gas constituting another possible source of metal electrode corrosion. Here the expression "sealant polymer" means that the material making up the polymer enables an object that forms a barrier to water, liquids and electrons to be obtained.

Advantageously, the impregnation of the fiber array may further comprise:
  removing the polymer on a surface of the membrane such that the first surface of the fiber array is devoid of polymer.

This additional step of removing surplus polymer on a membrane surface ensures that the paths for conducting ions via fibers through the membrane are not blocked by the polymer of the second material. By adding this step, it is possible to carry out impregnation by dipping the fiber array into a solution of the second material polymer.

According to an embodiment, as the first material is present in the form of inorganic particles, the method may further comprise:
  performing spark plasma sintering of the fiber array prior to impregnating the fiber array to ensure a connection of inorganic particles of sealant fibers in the fiber array.

Such a step ensures that the synthesized fibers are sealing, particularly when they are constituted of particles from an inorganic material. In fact, spark plasma sintering enables inorganic particles to be brought together and a more homogeneous phase to be created within the fiber. This step may also be of interest in view of treating fibers originally comprising a mixture of ion-conducting inorganic particles and an organic material. In this particular case, sintering, possibly combined with a previous thermal treatment, eliminates the organic material in view of creating an essentially homogeneous phase in the inorganic material.

According to an embodiment, after the electrically assisted extrusion of the sealant fibers, the method may further comprise:
  depositing, on the ion-conducting fiber array, a third material chosen from among the group constituted of a photo-activated polymerization polymer, an electrically activated polymerization polymer.

Such a step enables the mechanical properties of the membrane to be modulated and ensures better cohesion between sealant fibers and the polymer of the second material as well as better densification of the polymer of the second material. However, it must be ensured that electrically conductive areas in the membrane between a liquid electrolyte and the metal electrode are not created. The use of a photo-activated polymerization polymer or an electrically activated polymerization polymer is practical for increasing the density of the polymer of the second material and strengthening the link between the fiber array and this polymer to enable waterproofness.

Advantageously, the electrically assisted extrusion of sealant fibers may further comprise:
  extruding the sealant fibers by using at least one nozzle with a chosen diameter comprising several material inlets for synthesizing a sealant fiber with a chosen dimension, and
  controlling the dosing and arranging of materials composing the sealant fibers by using various material inlets of the nozzle.

The use of a nozzle with several material inlets may enable extrusion and impregnation to be carried out in a single step. Fibers covered on their periphery with a waterproof polymer may simply be regrouped and undergo an additional thermal treatment step for example to constitute a membrane. It is also possible to confer conduction and mechanical strength properties that can be changed at will by exploiting the fiber architecture and composition by using a nozzle with several material inlets.

According to an embodiment, the method may further comprise:
  Performing electrically assisted extrusion and impregnation on the surface of a metal negative electrode of a metal-air battery.

In particular, this ensures that the first surface of the fiber array is not completely covered with the polymer of the second material. Completely covering the fibers with the polymer of the second material could interfere with the conduction of ions between the electrode and the liquid electrolyte of an electrochemical cell. By synthesizing sealant fibers directly on the electrode surface, and by impregnating the fiber array on the support intended to receive the membrane, a contact in view of effective ion conduction from the metal electrode to the electrolyte and vice versa can be obtained.

The present invention also relates to a waterproof and ion-conducting flexible membrane intended for protecting a metal electrode comprising:
  a fiber array comprising sealant and ion-conducting fibers comprising at least one first material, the fiber array defining a first surface and a second surface opposite the first surface;
  a second material comprising a polymer impregnating the fiber array and thus forming a metal electrode protection membrane, the fiber array forming ion conduction paths between the first and second surfaces and through the polymer of the second material, the first surface being intended to be in contact with the metal electrode.

Such a waterproof membrane enables a metal electrode to be protected from an electrolyte. Thanks to its flexibility, it also ensures good contact with the metal electrode as well as effective ionic conduction between the electrode and an electrolyte thanks to the sealant fibers.

According to an embodiment, the membrane can be intended for the protection of an electrode of a metal-air type electrochemical cell using an alkali metal, in aqueous medium, and the polymer impregnating the first surface of the fiber array can be sealing.

A sealant polymer of the second material could prove suitable for protecting a negative metal electrode of a metal-air battery using an alkali metal. Indeed, the metal electrode of such a cell is not stable in the aqueous electrolyte.

According to an embodiment, the fiber array may comprise sealant fibers comprising:
  a central part comprising ion-conducting particles of the first material, and
  a peripheral part surrounding the central part comprising a sealant polymer.

Such an embodiment ensures that the sealant fibers are surrounded by a waterproof material. The polymer of the peripheral part is waterproof. The sealant polymer may be the polymer of the second material, and then may be introduced by impregnation during the electrically assisted extrusion step. This sealant polymer may also be made in another material, and then may, for example, confer special mechanical properties to the membrane. The sealant polymer of the peripheral part can also be used to ensure better cohesion of the assembly constituted of the fiber array and the polymer of the second material. In particular, producing a fiber with two concentric layers creates anisotropic ion conduction paths, the ions thus following a linear path along the same fiber from the first to the second surface of the fiber array during their migration through the membrane.

According to another embodiment, the fiber array may comprise sealant fibers comprising:
  a central part comprising a fourth material, which is organic, comprising a polymer, and
  a central envelope surrounding the central part, comprising ion-conducting particles of the first material, and
  a peripheral part surrounding the central envelope, comprising a sealant polymer.

Alternately, the fiber array may comprise sealant fibers comprising:
  a central part comprising ion-conducting particles of the first material, and
  a central envelope surrounding the central part, comprising a fourth material, which is organic, comprising a polymer, and
  a peripheral part surrounding the central envelope, comprising a sealant polymer.

Such a fiber architecture with three concentric layers enables the mechanical strength and ion conduction properties in the membrane to be modulated more precisely.

In particular, it may prove advantageous to use a polymer as the central envelope, this polymer serving as a provisional binder for an intermediate step before spark plasma sintering, as described above. The central part may then comprise particles from the first material, in the form of a sol-gel precursor. Such an arrangement may give rise to a denser fiber after thermal treatment than a fiber obtained by sintering a mixture within the central part of particles from the first material with a polymer serving as a binder.

Advantageously, the first surface may have a physicochemical affinity with an outer surface of the metal electrode, said physicochemical affinity ensuring permanent contact between the first surface and the outer surface of the metal electrode.

The metal electrode of an electrochemical cell typically may be covered with a thin layer called the interface layer, arranged on the outer surface of the conductive material that the electrode comprises. The polymer of the second material forming the membrane that is the subject of the present invention as well as the sealant fibers of this membrane may advantageously comprise compounds promoting contact by chemical affinity with this interface layer. The physicochemical affinity may typically result in the formation of chemical bonds between the first surface and the interface layer of the metal electrode, or else maintenance by a Van der Waals type force. Therefore, when the shape of the negative metal electrode undergoes changes following charge and recharge cycles, contact between the protective membrane and the electrode is maintained over the entire surface covered by the membrane.

Advantageously, the first material may be chosen from among the group of inorganic compounds constituted of lithium aluminum titanium phosphate (LATP), $Li_{1,4}Al_{0,4}Ti_{1,6}(PO_4)_3$ $Li_{1,2}Al_{0,2}Ti_{1,8}(PO_4)_3$, $LiTi_2(PO_4)_3$, lithium titanium phosphate (LTP), $Li_{1+x+z}Al_x(Ti,Ge)_{2-x}Si_zP_{3-z}O_{12}$, perovskite $Li_{3x}La_{2/3-x}TiO_3$, $Na_3Si_2Zr_{1,88}Y_{0,12}PO_{12}$, $Na_3Si_2Zr_2PO_{12}$ or beta-$Al_2O_3$ and the second material may be chosen from among the group constituted of fluorinated polymers and polyvinylidene fluoride-hexafluoropropylene (PVDF-HFP).

These materials prove to be particularly interesting for lithium or sodium ion conduction and protection against an aqueous electrolyte. A PVDF-HFP membrane also ensures a barrier to the oxygen released in the recharge phase, otherwise likely to damage the negative electrode. Fluorinated polymers as the second material also present the advantage that they do not swell in contact with water, thereby preventing a mechanical stress from being exerted on the metal electrode or insulating fibers from the electrolyte. Alternative substances can be considered in applications involving the conduction of potassium (K), sodium (Na), and calcium (Ca) ions.

Advantageously, the membrane has a thickness of between one micron and one hundred microns.

Such a thickness maintains a good flexibility of the membrane, and prevents the fibers from being fully covered by the polymer of the second material.

The invention may, in particular, be implemented in a battery comprising at least one electrochemical cell comprising:
  a metal negative electrode immersed in a liquid electrolyte solution;
  a waterproof and ion-conducting flexible membrane intended for protecting a metal electrode comprising:
    a fiber array comprising sealant and ion-conducting fibers comprising at least one first material, the array of fibers defining a first surface and a second surface opposite the first surface;
    a second material comprising a polymer impregnating the fiber array and thus forming a metal electrode protection membrane, the fiber array forming ion conduction paths between the first and second surfaces and through the polymer of the second material, the first surface being intended to be in contact with the metal electrode, The waterproof and ion-conducting flexible membrane surrounding the negative electrode in the electrolyte solution.

BRIEF DESCRIPTION OF THE DRAWINGS

The method that is the subject of the invention will be better understood upon reading the following description of examples of embodiments presented for illustrative purposes, without limitation, and observing the drawings below in which.

For reasons of clarity, the dimensions of different elements represented in these figures are not necessarily in proportion with their real dimensions. In the figures, identical references correspond to identical elements.

DETAILED DESCRIPTION

The invention relates to a method for producing a waterproof and ion-conducting flexible membrane intended for protecting a metal electrode. It also relates to the membrane thus obtained and to an electrochemical cell using such a membrane to protect a metal electrode, for example in a metal-air type battery, particularly a battery using an alkaline metal electrode.

Figure 1:
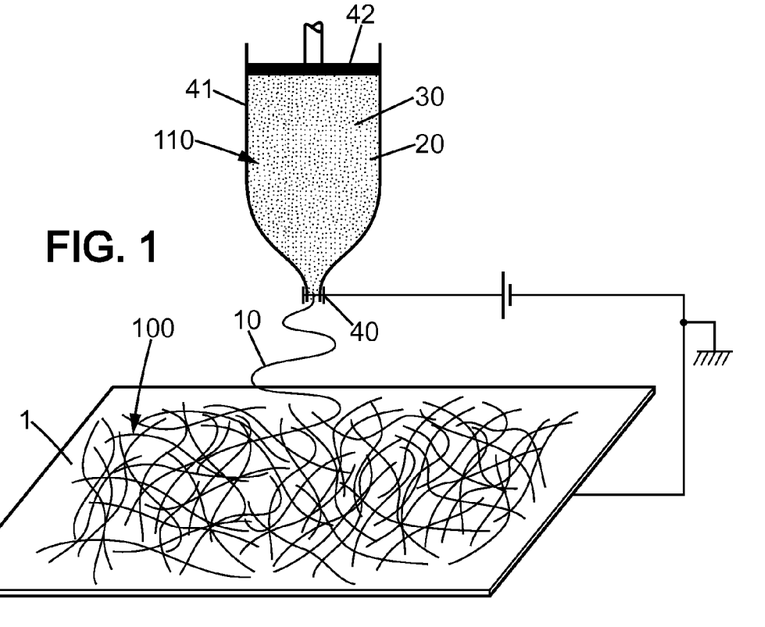
FIG. 1 is a schematic representation of an assembly for the synthesis of a fiber array by electrically assisted extrusion.

By way of example, FIG. 1 illustrates the production of a fiber array 100 constituted of sealant fibers 10 obtained by electrically assisted extrusion. The electrically assisted extrusion is carried out by subjecting a solution, for example constituted of a first material 20, to an electric field. In the example from FIG. 1, the solution 110 comprises particles from a first inorganic material 20, mixed with an organic phase 30. An electric field is applied by means of an electric circuit connecting a fiber 10 deposition support 1 to the nozzle 40 from which the solution 110 escapes. Support 1 thereby forms a counter electrode during deposition. Solution 110 is injected via the nozzle 40 of a syringe 41 by means of a syringe pump 42.

The deposition support 1 may also be any surface enabling the electrically assisted extrusion method to be implemented. It may be advantageous to deposit fibers 10 directly on the outer surface of a metal electrode intended to be protected by the membrane 300.

Depositing fibers 10 on a support 1 can be done in different ways by choosing the electrically assisted extrusion parameters. The voltage applied to the nozzle, the distance between the nozzle and the support 1, the nature and shape of the support, the speed of injection of solution 110 into nozzle 40 and the atmosphere in which the deposition is done, particularly the humidity level and temperature, are among the parameters that can be chosen for carrying out the electrically assisted extrusion.

Controlling these parameters enables the arrangement of fibers 10 within the fiber array 100, their enmeshment and their sealing to be defined. As will be described below, the sealing and the mechanical properties of a fiber can still be modified by a treatment step after extrusion.

Figure 2:
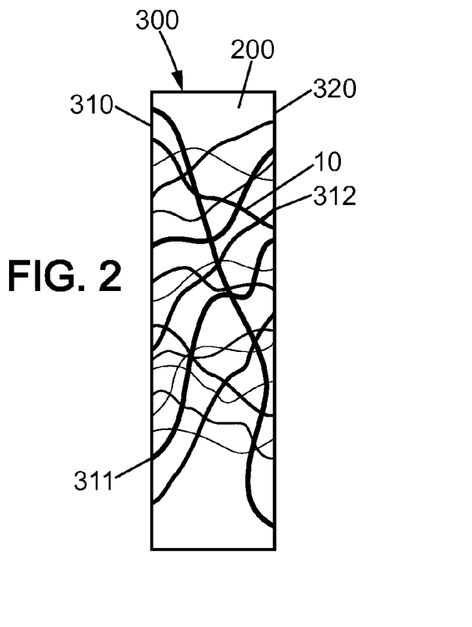
FIG. 2 is a schematic cross-sectional representation of a waterproof and ion-conducting flexible membrane intended for protecting a metal electrode according to the invention.
Figure 3:
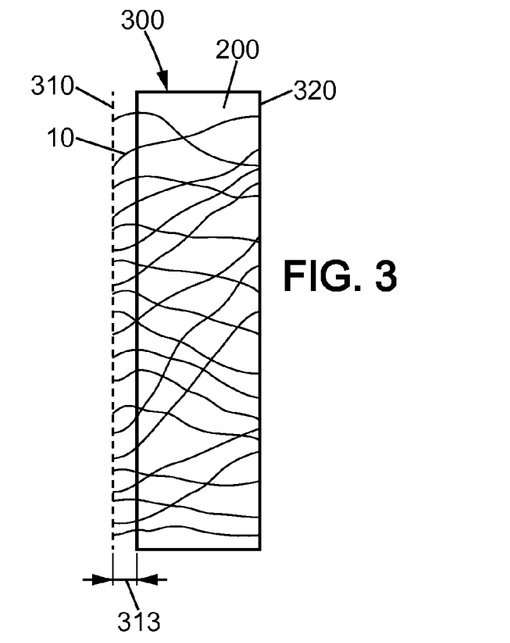
FIG. 3 is another schematic cross-sectional representation of a waterproof and ion-conducting flexible membrane intended for protecting a metal electrode according to the invention.

Once the fiber array 100 has been made, the method that is the subject of the invention continues with impregnation of the array in a polymer of a second material 200, in view of constituting a membrane 300 as represented by way of example in FIGS. 2 and 3.

Impregnation of the fiber array 100 can be done by dipping this fiber array in a solution of the polymer of the second material 200. It is also possible to pour the polymer solution in liquid form onto support 1 such that the second material 200 impregnates the fiber array 100. Other impregnation methods may also be considered.

The polymer of the second material 200 is chosen such that it can constitute a waterproof protective matrix in the membrane 300. Among the materials that enable obtaining such an effect fluorinated polymers and polyvinylidene fluoride-hexafluoropropylene (PVDF-HFP) can be found, for example. These materials present the special feature of being sealing and offering dual waterproofness, against water in liquid or vapor form, and gas-proofness. The waterproofness protects a metal electrode that membrane 300 protects from deterioration by a liquid electrolyte or by water vapor. Gas-proofness finds an application in the protection of metal electrodes of electrochemical cells of the metal-air type. In such cells, membrane 300 protects the electrode from oxygen produced in the recharge cycle and the oxygen dissolved in the liquid electrolyte during discharge, and thus prevents this oxygen from corroding the electrode. Other materials, for example materials only presenting the property of being waterproof, can be considered for the second material 200, particularly when the electrolyte used is not aqueous.

FIG. 2 schematically represents a membrane 300 according to the invention, issued from the method described above. This membrane comprises fibers 10 of a first material impregnated with a polymer of a second material 200. Fibers 10 constitute a fiber array 110, defining a first surface 310 and a second surface 320. In the example from FIG. 2, these surfaces 310, 320 correspond to two surfaces of membrane 300.

Impregnation of fibers 10 by the polymer of the second material 200 enables a waterproof membrane 300 to be constituted. Fibers 10 in the polymer of the second material 200 form ion conduction paths. As represented in FIG. 2, a fiber can form a conduction path from one of its ends 311 on the first surface 310 to its opposite end 312 on the second surface 320 of the fiber array 100.

In order to ensure the operation of an electrochemical cell when both charging and discharging, the membrane 300 preferentially comprises a significant number of fibers 10 forming conduction paths from the first surface 310 to the second surface 320. It should be noted that impregnation can unintentionally fully cover at least one of the ends of a fiber 10. Out of the significant number of fibers that a fiber array 100 typically comprises, for example one hundred thousand fibers per square millimeter, the proportion of fibers that are not used for conducting ions does not impede the operation of a cell comprising an electrode covered by membrane 300. In addition, several solutions enable this unintentional coverage to be remedied.

For example, it is possible to remove part of the polymer of the second material 200 after the impregnation step in order to expose the ends of fibers covered by the polymer. It is also possible to provide a reduced thickness for the polymer matrix of the second material 200 ensuring the sealing of membrane 300. By way of example, typical thicknesses of between 1 micron and 100 microns are suitable for guaranteeing good sealing and flexibility of the membrane without covering the ends of a significant number of fibers 10, thereby ensuring satisfactory ionic conduction.

The embodiment represented in FIG. 3 shows a membrane 300 in which the fibers 10 comprise prominent portions extending over a certain distance 313 beyond the sealing matrix formed by the polymer of the second material 200. The first surface 310 then does not coincide with a surface of this matrix. According to other embodiments, not represented, the second surface 320 of the fiber array can also not coincide with the matrix that forms the polymer of the second material 200.

When such membranes are applied to the surface of a metal electrode intended to be protected from water, ends 311 of fibers 10 on the first surface 310 of the fiber array 100 enter into contact with the metal electrode while the opposed ends 312 of fibers 10 of membrane 300 enter into contact with the electrolyte, thus ensuring a conduction path for ions between the electrode and the electrolyte, in both directions.

Figure 4:
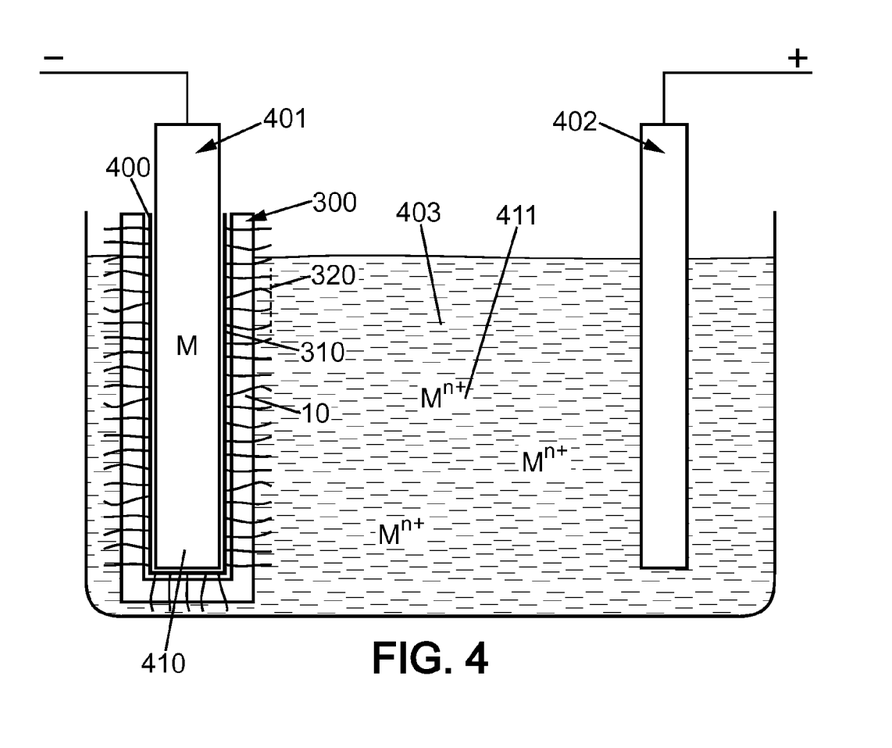
FIG. 4 is a schematic representation of an electrochemical cell comprising a metal electrode covered with a membrane according to the invention.

FIG. 4 schematically represents an electrochemical cell comprising a negative electrode 401, a positive electrode 402 and a liquid electrolyte solution 403. The negative electrode 401 is covered at least in its immersed part by a membrane 300 according to the invention. Electrode 401 is constituted of an active metal material 410. When discharging, this metal transits via fibers 10 from membrane 300 to electrolyte 403 in the form of ions 411. As illustrated in FIG. 4, electrode 401 also comprises an ion-conducting film 400 on its outer surface. Such a film forms a soft interface layer ensuring chemical affinity with membrane 300. This interface layer 400 thus maintains membrane 300 in contact with electrode 401 even after several cell charge and discharge cycles, and even if electrode 401 undergoes structural changes deforming its outer surface. Among the materials typically used to constitute the outer surfaces of metal electrodes forming interface layers, using a polymer electrolyte constituted of polyethylene oxide (PEO) with Li(CF$_3$SO$_2$)2N (LiTFSI) is, for example, known.

The flexibility of membrane 300, associated with the hybrid and composite structure connecting sealant fibers with a polymer matrix, enables the membrane to be flexible and therefore to follow the shape of any metal electrode 401. Such a membrane 300 can thus not only ensure permanent contact with a large surface of electrode 401 during the charge and discharge cycles of a cell, but it can also be installed on other electrodes with different shapes, sizes or even compositions. For example, the electrode can be coiled.

This flexibility confers an advantage to the membrane of the invention in relation to membranes from the prior art in rigid ceramic. Electrical contact with the outer surface of the electrode is reduced over the charge and discharge cycles of a cell with rigid membranes. In addition, a rigid membrane is only suitable for a specific electrode shape.

Unlike membranes used for example in hydrogen cells, in which the charge carriers involved are protons, the membrane of the invention is provided to only conduct ions from the first surface 310 to the second surface 320. The ions typically considered in electrochemical cells are lithium, calcium, potassium and sodium. Advantageously, the H+ ion does not traverse membrane 300. The use of "sealant" fibers 10 ensures that the fibers are not impregnated in a liquid during use, and do not enable the passage of water, liquid or electrons through the membrane. The "sealant" character of fibers 10, i.e., dense to the point where they are devoid of porosities likely to lead to impregnation by the liquid or even aqueous electrolyte, enables the fibers to fulfill optimally their ionic conduction role.

The synthesis of sealant fibers 10 by electrically assisted extrusion may not require any additional step. However, the sealing and ionic conduction of fibers 10 can be improved in various ways.

Most sealant fibers 10 are synthesized from particles of a first inorganic material 20. These particles can be obtained by soft chemistry methods such as coprecipitation or by sol-gel type methods. Their typical size is between 1 nm and 1 micron. A fiber 10 constituted of particles can be considered to be sealant when the particles and the space between these particles do not allow water to pass. To best respond to this criterion, it is possible to trap particles in a polymer 30 used as a binder. Particles from the first material 20 are then mixed with a solution containing a polymer 30 during extrusion, as represented in FIG. 1.

For certain applications, ionic conduction by particles from a first inorganic material 20 in the absence of polymer 30 is sought. For this purpose, a mixed fiber extruded from a solution 110 can undergo a thermal treatment to eliminate polymer 30 from fibers 10. This thermal treatment is followed by a sintering step, advantageously implemented at intermediate temperatures not deteriorating the particles of the first material 20. A particularly advantageous sintering method called "spark plasma sintering" consists of carrying out sintering under an electric field. Sintering ensures a suitable contact between the particles of the first material 20 constituting a fiber 10, reducing the resistance to the passage of ions.

It is also possible to carry out extrusion only from particles of a first inorganic material 20, held together in a fiber 10 without adding polymer into the fiber. In such an embodiment, it is possible to carry out spark plasma sintering without a prior thermal treatment.

The electrolyte solution can be liquid or even aqueous in the case, for example, of a metal-air cell. The electrolyte solution can also not be liquid, for example it can be a gel or a polymer. However, the waterproofness of the fibers and the membrane is an advantageous property for preserving an electrode from the water vapor that a cell may comprise.

Electrically assisted extrusion enables the mechanical, structural and electrical properties of the fibers 10 obtained to be finely controlled.

On the one hand, the composition of the solution 110 can be chosen so that the fibers preferentially conduct one particular type of ion. In this regard, compounds chosen from among lithium aluminum titanium phosphate (LATP), $Li_{1.4}Al_{0.4}Ti_{1.6}(PO_4)_3 Li_{1.2}Al_{0.2}Ti_{1.8}(PO_4)_3$, $LiTi_2(PO_4)_3$, lithium titanium phosphate (LTP), $Li_{1+x+z}Al_x(Ti,Ge)_{2-x}Si_zP_{3-z}O_{12}$ or perovskite $Li_{3x}La_{2/3-x}TiO_3$ are particularly suitable for conducting lithium Li+ ions. Other Na+, K+ or Ca2+ ion-conducting compounds can also be used. For example, compounds chosen from among $Na_3Si_2Zr_{1.88}Y_{0.12}PO_{12}$, $Na_3Si_2Zr_2PO_{12}$ or beta-$Al_2O_3$ can be selected for conducting sodium ions. These ions correspond to the species most often used in electrochemical cell electrodes, in which the invention finds an application for constituting membranes for protecting electrodes from corrosion by gas and/or an electrolyte.

The impregnation of a fiber array 100 formed by electrically assisted extrusion can be completed by other steps in view of conferring original properties to membrane 300.

For example, it is possible to complete the impregnation by electrodeposition or else photodeposition of a third material in particle or solution form. These additives can, for example, confer particular mechanical properties to the membrane, for example by adjusting the density or flexibility of the membrane 300.

Therefore, during impregnation, a copolymer can be deposited on the fiber array 100 or mixed with the polymer of the second material 200.

This copolymer can be a photo-activated polymerization polymer, such as for example 2,2,2-trifluoroethyl methacrylate or 1,1,1,3,3,3-hexa-fluoro-isopropyl methacrylate. This property can, in particular, ensure better cohesion between the fiber array 100 and the polymer of the second material 200. The photo-activated polymerization copolymer can also increase the density of the membrane, to enable an additional reduction in its thickness while conserving the waterproofness, flexibility and ion-conducting properties.

The copolymer can also be an electrically activated polymerization polymer, in view of conferring similar density increasing and/or better flexibility effects.

Electrically assisted extrusion enables the invention to be implemented according to several different embodiments.

On the one hand, a method in two distinct and successive steps involving extrusion and then impregnation of a fiber array is considered. On the other hand, the impregnation can be an integral part of the extrusion, when the nozzle 40 comprises several material inlets and the syringe 41 comprises several reservoirs.

Figure 5:
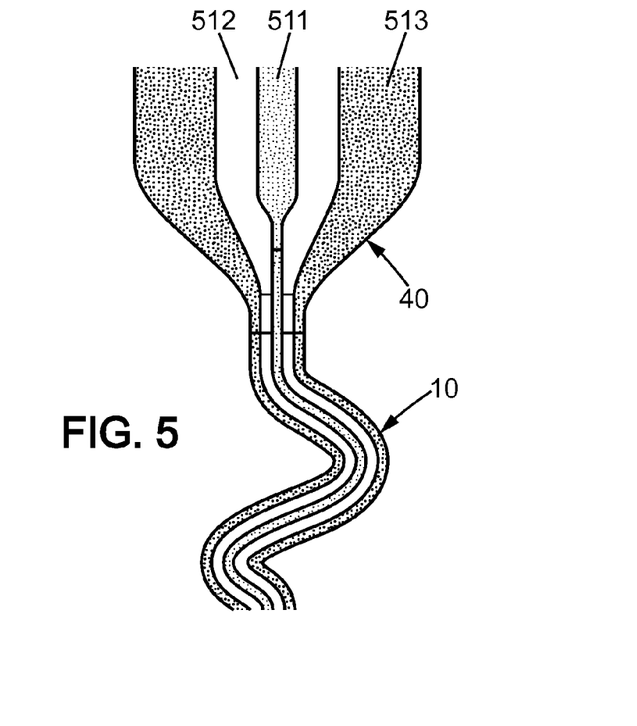
FIG. 5 is a schematic longitudinal sectional representation of a nozzle with three material inlets used for the extrusion of fiber with three layers.

An example of embodiment of a nozzle 40 with several material inlets is schematically represented in FIG. 5. A first compartment 511 comprises a material forming the central part of a fiber 10. A second compartment 512 comprises a material forming a central envelope surrounding the central part of a fiber 10. A third compartment 513 comprises a material forming a peripheral part of fiber 10 surrounding the central envelope. Other arrangements for a nozzle 40 providing more than three material inlets or else two or one material inlet can be considered.

By means of a nozzle 40 with several material inlets, it is particularly possible to constitute fibers 10 comprising a central ion-conducting part, and a peripheral part comprising the polymer of the second material 200. The impregnation step then is an integral part of the extrusion step. A waterproof matrix can for example be obtained either by increasing the density of fibers by means of compaction, or by an additional step of dipping into a material capable of binding or connecting the fibers thus obtained. Sealing of the membrane can also be obtained by the superimposition of a sufficient quantity of fibers 10, which may be maintained in contact with each other by a binding of the polymer material constituting the peripheral part of fibers 10.

By using a nozzle with several material inlets, many embodiments for constituting the membrane can be considered. The choice of the diameter of nozzle 40 enables the diameter of synthesized fibers 10 to be selected. Controlling the dosing and arrangement of materials forming sealant fibers 10 enables the mechanical and electrical properties of membrane 300 to be adjusted. Some examples are provided below.

Figure 6:
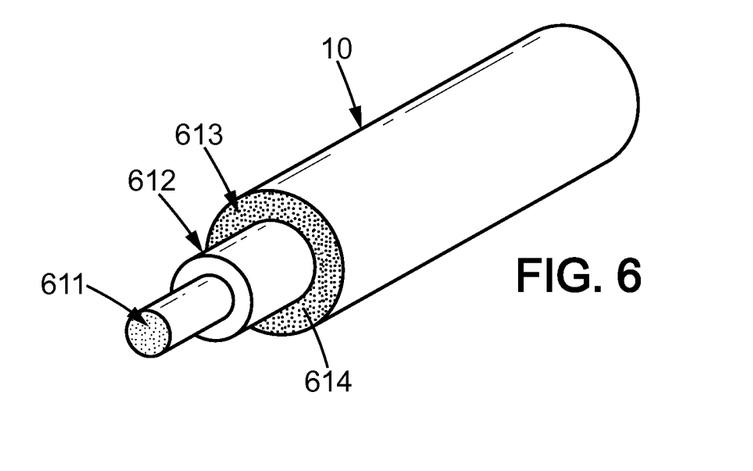
FIG. 6 is a schematic representation of a fiber with three concentric layers used in the membrane according to the invention.

As represented in FIG. 6, a fiber 10 can comprise three concentric layers. A central part 611 can comprise the first ion-conducting material. A central envelope 612 surrounding the central part can comprise a polymer of a fourth organic material comprising a polymer. A peripheral part 613 surrounding the central envelope comprises a sealant polymer. Such a fiber 10 has mechanical strength properties that are more easily modulated than a fiber constituted only of a first ion-conducting material. The addition of a third material 614 into the sealant polymer ensures better interfaces between the fibers 10 of the fiber array 100 and the polymer of the second material 200.

As a variation, the central part may comprise a polymer from a fourth organic material and the central envelope surrounding the central part can comprise the first ion-conducting material.

Figure 7:
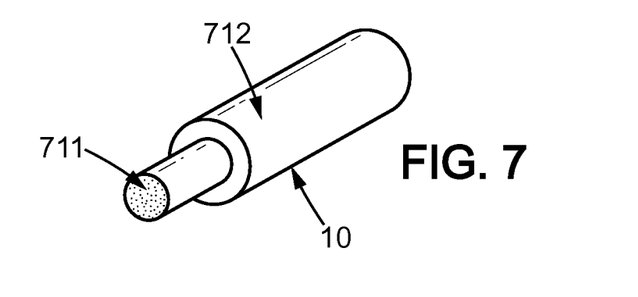
FIG. 7 is a schematic representation of a fiber with two concentric layers used in the membrane according to the invention.

FIG. 7 represents a fiber 10 with two concentric layers whose implementation is simpler. Fiber 10 comprises a central part 711 in a first inorganic and ion-conducting material and a peripheral part 712 in a sealant polymer.

In an advantageous embodiment, an arrangement in two or three layers can be used to confine the particles in the form of a sol-gel precursor in a central part, by means of a polymer serving as a binder used as the central envelope. This binder polymer is only present temporarily in the fiber, and is eliminated during a spark plasma sintering step, as described above. Such an arrangement may give rise to a denser fiber after thermal treatment than a fiber obtained by sintering a mixture within the central part of particles from the first material with a polymer serving as a binder.

In general, coating an ion-conducting portion of a fiber 10 in a polymer that does not conduct ions and that is waterproof enables anisotropic ion-conducting paths to be created in the membrane. Consequently, the electrical properties of the membrane can be adjusted depending on the composition of fibers 10 and the polymer of the second material 200.

An example of embodiment of a fiber array 10 and a membrane 100 is briefly described below.

A sol comprising precursors of the first material 20 is mixed with a support polymer of the PVDF-HFP type in a solvent.

200 mg of polymer is added to 20 mL of tetrahydrofuran. The solution is stirred at a temperature of between 50° C. and 100° C. for a quarter of an hour to dissolve the polymer, and is then cooled to ambient temperature. Under mechanical stirring, 1 gram of phenylphosphonic acid, 200 mg of lithium nitrate and 0.5 grams of non-hydrated aluminum nitrate are then added to the solution.

The solution thus created is used in a syringe to synthesize fibers by electrically assisted extrusion. A syringe pump displaces the liquid at a rate of 0,1 mL/min by the syringe nozzle, under a voltage of 22 kV with a spacing of 10 cm between the nozzle and the support forming the counter electrode. The fibers are calcined to obtain an inorganic array of $Li_{1+x}Al_xTi_{2-x}(PO_4)_3$ oxides or $Li_{3x}La_{2/3-x}TiO_3$ cation conducting fibers. The fibers are impregnated with polymer by using a PVDF-HFP/DMF solution with a weight ratio of 3%.

Optionally, the membrane thus constituted can be turned around and treated at 170° C. for 15 min between two metal plates so that the membrane obtained retains flatness at rest.

The membranes thus obtained have an ionic conductivity of $10^{-6}$ Siemens per centimeter for a membrane with a thickness of 40 microns.

The invention is not limited to the embodiments described above. In particular, fibers 10 may be made of a first fully organic, ion-conducting and waterproof material. In such an embodiment, membrane 300 is made in its entirety of an organic material.

The invention claimed is:

1. A method for producing a waterproof and ion-conducting flexible membrane for protecting a metal electrode comprising:
synthesizing, by electrically assisted extrusion, sealant fibers forming a fiber array of ion-conducting fibers comprising at least one first material, the fiber array defining a first surface and a second surface opposite the first surface;
impregnating the fiber array with a polymer of a second material, to form a metal electrode protection membrane, the fiber array forming ion conduction paths between the first and second surfaces and through the polymer of the second material, the first surface being in contact with the metal electrode.

2. The method according to claim 1, wherein the fiber array impregnation further comprises:
removing the polymer on a surface of the membrane such that the first surface of the fiber array is devoid of polymer.

3. The method according to claim 1, wherein the first material is present in the form of inorganic particles, the method further comprises:
performing spark plasma sintering of the fiber array prior to impregnating the fiber array to ensure a connection of inorganic particles of sealant fibers in the fiber array.

4. The method according to claim 1, wherein, after the electrically assisted extrusion of sealant fibers, the method further comprises:
depositing, on the ion-conducting fiber array, a third material chosen from among the group constituted of a photo-activated polymerization polymer, an electrically activated polymerization polymer.

5. The method according to claim 1, wherein the electrically assisted extrusion of sealant fibers further comprises:
extruding the sealant fibers by using at least one nozzle with a chosen diameter comprising several material inlets for synthesizing a sealant fiber with a chosen dimension, and
controlling the dosage and arrangement of materials composing the sealant fibers by using various material inlets of the nozzle.

6. The method according to claim 1, wherein the method further comprises:
performing electrically assisted extrusion and impregnation on the surface of a metal negative electrode of a metal-air battery.

7. A waterproof and ion-conducting flexible membrane for protecting a metal electrode comprising:
a fiber array comprising sealant and ion-conducting fibers comprising at least one first material, the fiber array defining a first surface and a second surface opposite the first surface;
a second material comprising a polymer impregnating the fiber array and thus forming a metal electrode protection membrane, the fiber array forming ion conduction paths between the first and second surfaces and through the polymer of the second material, the first surface being in contact with the metal electrode.

8. The membrane according to claim 7, wherein the fiber array comprises sealant fibers comprising:
a central part comprising ion-conducting particles of the first material, and
a peripheral part surrounding the central part comprising a sealant polymer.

9. The membrane according to claim 7, wherein the fiber array comprises sealant fibers comprising:
a central part comprising a fourth material, which is organic, comprising a polymer, and
a central envelope surrounding the central part, comprising ion-conducting particles of the first material, and
a peripheral part surrounding the central envelope, comprising a sealant polymer.

10. The membrane according to claim 7, wherein the fiber array comprises sealant fibers comprising:
a central part comprising ion-conducting particles of the first material, and
a central envelope surrounding the central part, comprising a fourth material, which is organic, comprising a polymer, and
a peripheral part surrounding the central envelope, comprising a sealant polymer.

11. The membrane according to claim 7, wherein the first surface has a physicochemical affinity with an outer surface of the metal electrode, said physicochemical affinity ensuring permanent contact between the first surface and the outer surface of the metal electrode.

12. The membrane according to claim 7, wherein the first material may be chosen from among the group of inorganic compounds constituted of lithium aluminum titanium phosphate (LATP), $Li1.4Al0.4Ti1.6(PO4)3$ $Li1.2Al0.2Ti1.8(PO4)3$, $LiTi2(PO4)3$, lithium titanium phosphate (LTP), $Na3Si2Zr1.88Y0.12PO12$, $Na3Si2Zr2PO12$ or beta-$Al2O3$ and the second material may be a fluorinated polymer.

13. The membrane according to claim 7, wherein the membrane has a thickness of between one micron and one hundred microns.

14. A battery comprising at least one electrochemical cell comprising:
a metal negative electrode immersed in a liquid electrolyte solution;
a waterproof and ion-conducting flexible membrane for protecting a metal electrode comprising:
a fiber array comprising sealant and ion-conducting fibers comprising at least one first material, the fiber array defining a first surface and a second surface opposite the first surface;
a second material comprising a polymer impregnating the fiber array and thus forming a metal electrode protection membrane, the fiber array forming ion conduction paths between the first and second surfaces and through the polymer of the second material, the first surface being in contact with the metal electrode,
the waterproof and ion-conducting flexible membrane surrounding the negative electrode in the electrolyte solution.

* * * * *